(12) United States Patent
Preller, Jr.

(10) Patent No.: US 10,206,385 B2
(45) Date of Patent: Feb. 19, 2019

(54) LIMB LINE FISHING DEVICE

(71) Applicant: Arthur I. Preller, Jr., Augusta, AR (US)

(72) Inventor: Arthur I. Preller, Jr., Augusta, AR (US)

( * ) Notice: Subject to any disclaimer, the term of this patent is extended or adjusted under 35 U.S.C. 154(b) by 0 days.

(21) Appl. No.: 14/284,976

(22) Filed: May 22, 2014

(65) Prior Publication Data

US 2014/0250761 A1  Sep. 11, 2014

Related U.S. Application Data

(63) Continuation-in-part of application No. 13/905,507, filed on May 30, 2013.

(60) Provisional application No. 61/658,982, filed on Jun. 13, 2012.

(51) Int. Cl.
*A01K 97/12* (2006.01)
*A01K 97/06* (2006.01)
*A01K 91/06* (2006.01)
*A01K 89/08* (2006.01)

(52) U.S. Cl.
CPC .............. *A01K 97/12* (2013.01); *A01K 89/08* (2013.01); *A01K 91/06* (2013.01); *A01K 97/06* (2013.01)

(58) Field of Classification Search
CPC ........ A01K 91/06; A01K 91/18; A01K 97/12; A01K 97/06; A01K 89/08
USPC ......... 43/43.11, 43.1, 44.87, 17, 42.36, 57.1, 43/57.2, 57.3, 4, 42.23, 42.22, 20; 441/1, 441/6, 23, 25; 242/405, 405.1, 405.2, 242/405.3
See application file for complete search history.

(56) References Cited

U.S. PATENT DOCUMENTS

| | | | | |
|---|---|---|---|---|
| 458,129 A * | 8/1891 | Papin | ..................... | A01K 93/00 43/43.1 |
| 484,254 A * | 10/1892 | Settle | ..................... | A01K 95/00 24/129 R |
| 595,998 A * | 12/1897 | Garland | ................. | A01K 97/06 43/57.2 |
| 689,497 A * | 12/1901 | Kepler | ................... | A01K 93/00 43/43.1 |
| 933,189 A * | 9/1909 | Linnell | .................. | B65H 75/06 223/106 |
| 1,153,053 A * | 9/1915 | Forster | ................... | A01K 91/04 24/129 B |
| 1,516,522 A * | 11/1924 | Farr | ..................... | A01K 89/015 242/405.1 |
| 1,634,436 A * | 7/1927 | Polson | ................... | B65H 75/06 242/405.2 |
| 1,655,065 A * | 1/1928 | Le Baron | ............... | B65H 75/06 242/405.2 |

(Continued)

FOREIGN PATENT DOCUMENTS

EP  483074 A2 *  4/1992
FR  2736799 A1 *  1/1997  ............. A01K 89/08

OTHER PUBLICATIONS

Translation of EP483074.*

*Primary Examiner* — Darren W Ark
(74) *Attorney, Agent, or Firm* — Richard Blakely Glasgow

(57) ABSTRACT

A limb line fishing device having a length of fishing line and an indicator. The indicator slidably receives the fishing line. The indicator tube can be used to determine at a distance whether a fish has been caught. The fishing device is capable of securing a reusable line and a hook when the device is not in use.

16 Claims, 5 Drawing Sheets

(56) References Cited

U.S. PATENT DOCUMENTS

| | | | | |
|---|---|---|---|---|
| 1,885,311 A * | 11/1932 | Whitcomb | A01K 93/00 | 43/43.11 |
| 1,918,507 A * | 7/1933 | Westling | A01K 93/00 | 43/43.11 |
| 2,008,555 A * | 7/1935 | Kovane | A01K 97/01 | 43/16 |
| 2,014,517 A * | 9/1935 | Beregow | A01K 83/00 | 43/43.11 |
| 2,151,609 A * | 3/1939 | Menderman | A01K 91/04 | 43/44.91 |
| 2,205,352 A * | 6/1940 | Fisher | A01K 93/02 | 200/220 |
| 2,222,802 A * | 11/1940 | Ragsdale | A47F 13/04 | 43/17 |
| 2,229,935 A * | 1/1941 | Powers | E04H 15/322 | 24/129 B |
| 2,239,227 A * | 4/1941 | Gunnufson | A01K 87/00 | 43/20 |
| 2,252,358 A * | 8/1941 | Tosi | A01K 93/02 | 200/51 R |
| 2,280,457 A * | 4/1942 | Suteliffe | A01K 93/02 | 362/157 |
| 2,329,790 A * | 9/1943 | Seigle | A01K 93/00 | 362/158 |
| 2,413,371 A * | 12/1946 | Parker | A01K 85/16 | 43/43.11 |
| 2,422,358 A * | 6/1947 | Lobl | B65H 54/68 | 242/405 |
| 2,448,681 A * | 9/1948 | Nutter | A01K 93/02 | 200/61.52 |
| 2,492,033 A * | 12/1949 | Cherriere | A01K 93/00 | 43/43.1 |
| 2,514,110 A * | 7/1950 | Warren | A01K 91/18 | 43/57.1 |
| 2,533,341 A * | 12/1950 | Alfano | H02G 11/02 | 24/129 R |
| 2,547,469 A * | 4/1951 | Husson | A01K 91/047 | 24/129 R |
| 2,592,441 A * | 4/1952 | Louthan | A01K 93/00 | 43/43.11 |
| 2,594,472 A * | 4/1952 | McClain | A01K 97/16 | 43/57.2 |
| 2,609,689 A * | 9/1952 | Harris | G01K 13/12 | 43/43.11 |
| 2,628,443 A * | 2/1953 | Weckerling | A01K 97/01 | 43/15 |
| 2,650,052 A * | 8/1953 | Bintz | A01K 97/01 | 43/21.2 |
| 2,655,758 A * | 10/1953 | Warren | A01K 91/18 | 43/57.2 |
| 2,663,962 A * | 12/1953 | King | A01K 97/12 | 43/17 |
| 2,683,937 A * | 7/1954 | Criswell | G01C 15/10 | 24/910 |
| 2,714,270 A * | 8/1955 | Premo | A01K 97/01 | 43/15 |
| 2,720,720 A * | 10/1955 | Landrum | A01K 93/00 | 43/43.11 |
| 2,722,767 A * | 11/1955 | Grady | A01K 93/00 | 43/43.11 |
| 2,724,206 A * | 11/1955 | Miller | A01K 93/00 | 43/42.31 |
| 2,760,295 A * | 8/1956 | Bond | A01K 93/00 | 43/43.11 |
| 2,811,805 A * | 11/1957 | McGee | A01K 93/00 | 43/42.31 |
| 2,842,886 A * | 7/1958 | Williams | A01K 93/00 | 43/44.87 |
| 2,860,442 A * | 11/1958 | Turner | A01K 93/00 | 43/43.11 |
| 2,887,816 A * | 5/1959 | Hudkins | A01K 93/00 | 43/43.11 |
| 2,910,798 A * | 11/1959 | Bias | A01K 93/00 | 43/41.2 |
| 2,911,754 A * | 11/1959 | Mills | A01K 93/00 | 43/43.11 |
| 2,915,847 A * | 12/1959 | Hancock | A01K 93/00 | 43/43.11 |
| 2,924,039 A * | 2/1960 | Morton | A01K 93/00 | 43/43.11 |
| 2,977,608 A * | 4/1961 | Brown, Sr. | A01K 93/00 | 43/43.11 |
| 3,003,277 A * | 10/1961 | Vann | A01K 93/00 | 43/42.22 |
| 3,033,487 A * | 5/1962 | Walker | A01K 97/01 | 242/118.4 |
| 3,042,337 A * | 7/1962 | Dinneen | B65H 54/68 | 242/405 |
| 3,106,797 A * | 10/1963 | Hancock | A01K 93/00 | 43/43.11 |
| 3,133,683 A * | 5/1964 | Deacon, Sr. | B65D 85/04 | 43/57.3 |
| 3,147,563 A * | 9/1964 | Molter | A01K 97/01 | 43/17 |
| 3,160,979 A * | 12/1964 | Bissell | A01K 91/047 | 24/129 R |
| 3,171,227 A * | 3/1965 | Merrill | A01K 89/08 | 43/20 |
| 3,174,703 A * | 3/1965 | Falkum | A01K 89/08 | 242/405.2 |
| 3,190,026 A * | 6/1965 | Roszak | A01K 97/12 | 43/17 |
| 3,200,533 A * | 8/1965 | Early | A01K 91/18 | 43/57.3 |
| 3,205,608 A * | 9/1965 | Dickinson | A01K 85/16 | 43/42.05 |
| 3,214,858 A * | 11/1965 | Louie | A01K 97/02 | 43/43.11 |
| 3,292,298 A * | 12/1966 | Mullikin | A01K 91/18 | 43/57.2 |
| 3,295,245 A * | 1/1967 | Mullikin | A01K 91/18 | 43/57.1 |
| 3,341,965 A * | 9/1967 | Purcella | A01K 93/00 | 43/43.11 |
| 3,352,050 A * | 11/1967 | Mowrey | A01K 91/02 | 43/43.11 |
| 3,394,484 A * | 7/1968 | Sonoski | A01K 97/01 | 43/16 |
| 3,407,528 A * | 10/1968 | Lenning | A01K 97/01 | 43/17 |
| 3,486,267 A * | 12/1969 | Hitre | A01K 91/18 | 43/57.3 |
| 3,524,277 A * | 8/1970 | Neubert | A01K 91/08 | 43/43.13 |
| 3,535,815 A * | 10/1970 | Lowndes | A01K 91/053 | 43/43.12 |
| 3,543,430 A * | 12/1970 | Brokaw | A01K 85/00 | 43/42.02 |
| 3,564,755 A * | 2/1971 | Lindgren, Sr. | A01K 97/06 | 43/57.2 |
| 3,613,289 A * | 10/1971 | Wehren | A01K 93/00 | 43/43.11 |
| 3,613,290 A * | 10/1971 | Wehren | A01K 91/08 | 43/42.05 |
| 3,667,148 A * | 6/1972 | Dawson | A01K 91/08 | 43/43.13 |
| 3,675,276 A * | 7/1972 | Nuse | A01K 91/04 | 24/129 B |
| 3,703,783 A * | 11/1972 | Pool | A01K 91/02 | 43/43.11 |
| 3,714,923 A * | 2/1973 | Mariani | A01K 91/20 | 116/209 |
| 3,775,893 A * | 12/1973 | McGee, Jr. | A01K 91/18 | 43/57.3 |
| 3,778,916 A * | 12/1973 | Wallace | A01K 87/00 | 43/43.11 |
| 3,785,080 A * | 1/1974 | Wallace | A01K 97/06 | 43/54.1 |

(56) References Cited

U.S. PATENT DOCUMENTS

| | | | | |
|---|---|---|---|---|
| 3,832,746 A * | 9/1974 | Korsgaard | B65H 75/06 | |
| | | | 242/405.2 | |
| 3,911,610 A * | 10/1975 | Goodman | A01K 91/06 | |
| | | | 43/43.1 | |
| 4,006,554 A * | 2/1977 | Tice | A01K 97/06 | |
| | | | 43/57.2 | |
| 4,137,664 A * | 2/1979 | Beres | A01K 95/00 | |
| | | | 43/43.1 | |
| 4,161,839 A * | 7/1979 | Ward | A01K 97/10 | |
| | | | 43/17 | |
| 4,200,190 A * | 4/1980 | Tyson | A01K 91/06 | |
| | | | 206/315.1 | |
| 4,209,930 A * | 7/1980 | Boynton | A01K 97/125 | |
| | | | 43/17 | |
| 4,212,127 A * | 7/1980 | Daniels | A01K 91/02 | |
| | | | 43/43.12 | |
| 4,261,529 A * | 4/1981 | Sandberg | B63B 35/817 | |
| | | | 242/405.2 | |
| 4,373,287 A * | 2/1983 | Grahl | A01K 97/01 | |
| | | | 43/17 | |
| 4,380,131 A * | 4/1983 | Lazan, Jr. | A01K 91/10 | |
| | | | 43/15 | |
| 4,413,438 A * | 11/1983 | Hayne | A01K 93/00 | |
| | | | 43/43.11 | |
| 4,472,902 A * | 9/1984 | Fraser | A01K 91/06 | |
| | | | 43/43.11 | |
| 4,532,731 A * | 8/1985 | Wheeler | A01K 91/08 | |
| | | | 24/169 | |
| 4,571,878 A * | 2/1986 | Nyman | A01K 93/00 | |
| | | | 43/43.11 | |
| 4,607,449 A * | 8/1986 | Brachear | A01K 91/06 | |
| | | | 43/43.11 | |
| 4,642,930 A * | 2/1987 | Graf | A01K 97/01 | |
| | | | 43/17 | |
| 4,680,886 A * | 7/1987 | Caselli, Sr. | A01K 97/06 | |
| | | | 43/57.1 | |
| 4,681,220 A * | 7/1987 | Beneke | A01K 97/06 | |
| | | | 43/57.1 | |
| 4,696,125 A * | 9/1987 | Rayburn | A01K 93/00 | |
| | | | 43/43.14 | |
| 4,779,816 A * | 10/1988 | Varlet | B65H 75/06 | |
| | | | 24/910 | |
| 4,837,965 A * | 6/1989 | True | A01K 97/01 | |
| | | | 43/17 | |
| 4,866,874 A * | 9/1989 | Dudley | A01K 91/02 | |
| | | | 43/43.11 | |
| 4,870,776 A * | 10/1989 | Schock | A01K 85/16 | |
| | | | 43/42.06 | |
| 4,939,864 A * | 7/1990 | Bowles | A01K 97/12 | |
| | | | 43/17 | |
| 4,977,700 A * | 12/1990 | Perlman | A01K 97/06 | |
| | | | 43/57.2 | |
| D316,665 S * | 5/1991 | Lueth | D22/134 | |
| 5,014,459 A * | 5/1991 | Sublet | A01K 91/047 | |
| | | | 24/129 R | |
| 5,050,333 A * | 9/1991 | Debreczeni | A01K 97/10 | |
| | | | 43/17 | |
| 5,189,827 A * | 3/1993 | Mrozek | A01K 91/053 | |
| | | | 24/129 R | |
| 5,344,093 A * | 9/1994 | Cohen | A01K 89/08 | |
| | | | 242/405.2 | |
| 5,367,817 A * | 11/1994 | Clark | A01K 85/00 | |
| | | | 43/42.36 | |
| 5,475,944 A * | 12/1995 | Mathews | A01K 91/18 | |
| | | | 43/57.3 | |
| 5,533,297 A * | 7/1996 | Crosby | A01K 97/06 | |
| | | | 43/57.2 | |
| 5,551,183 A * | 9/1996 | Solem | A01K 97/01 | |
| | | | 43/17 | |
| 5,603,182 A * | 2/1997 | Wilson | A01K 85/01 | |
| | | | 43/44.99 | |
| 5,615,509 A * | 4/1997 | Washington | A01K 91/06 | |
| | | | 43/4 | |
| 6,018,903 A * | 2/2000 | Miralles | A01K 91/08 | |
| | | | 43/43.12 | |
| 6,079,142 A * | 6/2000 | Danser | A01K 97/01 | |
| | | | 43/17 | |
| 6,105,299 A * | 8/2000 | Rich | A01K 91/10 | |
| | | | 43/42.36 | |
| 6,142,451 A * | 11/2000 | Lindsey | B65H 75/06 | |
| | | | 242/405.1 | |
| 6,269,583 B1 * | 8/2001 | Tashchyan | A01K 85/14 | |
| | | | 43/4 | |
| 6,279,260 B1 * | 8/2001 | Farr | A01K 91/06 | |
| | | | 43/42.5 | |
| 6,321,481 B1 * | 11/2001 | Presnell | A01K 93/00 | |
| | | | 43/43.1 | |
| 6,401,382 B2 * | 6/2002 | Larkin | A01K 93/00 | |
| | | | 43/43.11 | |
| 6,453,600 B1 * | 9/2002 | Craig | A01K 91/08 | |
| | | | 43/43.13 | |
| 6,772,551 B1 * | 8/2004 | Bielinski, Sr. | A01K 97/01 | |
| | | | 43/15 | |
| 6,796,076 B1 * | 9/2004 | Bennett | A01K 91/10 | |
| | | | 43/16 | |
| 6,851,215 B2 * | 2/2005 | Conrad | A01K 97/00 | |
| | | | 43/4 | |
| 6,983,498 B2 * | 1/2006 | Peterson | A47G 9/086 | |
| | | | 24/129 B | |
| 7,011,262 B2 * | 3/2006 | Patterson | A01K 87/06 | |
| | | | 43/20 | |
| 7,043,871 B2 * | 5/2006 | Chapel | A01K 97/06 | |
| | | | 43/57.1 | |
| 7,174,669 B1 * | 2/2007 | Kallas | A01K 85/01 | |
| | | | 43/42.36 | |
| 7,343,708 B2 * | 3/2008 | Pieczynski | A01K 97/01 | |
| | | | 43/17 | |
| 7,797,876 B2 * | 9/2010 | McKelvey | A01K 89/08 | |
| | | | 43/43.11 | |
| 7,954,274 B2 * | 6/2011 | MacDonald | A01K 85/00 | |
| | | | 43/42.36 | |
| 8,316,577 B2 * | 11/2012 | Hale | A01K 89/08 | |
| | | | 43/43.11 | |
| 8,474,174 B2 * | 7/2013 | Norman | A01K 85/01 | |
| | | | 43/42.36 | |
| 8,607,497 B2 * | 12/2013 | Green | A01K 87/00 | |
| | | | 43/42.72 | |
| 8,943,740 B1 * | 2/2015 | Rathje, Jr. | A01K 97/06 | |
| | | | 43/57.2 | |
| 9,021,736 B2 * | 5/2015 | Miller | A01K 93/02 | |
| | | | 43/43.11 | |
| 9,179,658 B2 * | 11/2015 | Galbraith | A01K 97/01 | |
| 9,642,350 B2 * | 5/2017 | Aiello | A01K 97/01 | |
| 2005/0217166 A1 * | 10/2005 | MacDonald | A01K 85/00 | |
| | | | 43/42.36 | |
| 2006/0201048 A1 * | 9/2006 | Garriott | A01K 89/08 | |
| | | | 43/17 | |
| 2007/0277424 A1 * | 12/2007 | Hale | A01K 89/08 | |
| | | | 43/43.11 | |
| 2008/0052981 A1 * | 3/2008 | Richardson | A01K 97/01 | |
| | | | 43/17 | |
| 2008/0066366 A1 * | 3/2008 | Todd | A01K 97/125 | |
| | | | 43/17 | |
| 2013/0318856 A1 * | 12/2013 | Rice | A01K 85/00 | |
| | | | 43/42.02 | |
| 2013/0333269 A1 * | 12/2013 | Preller, Jr. | A01K 97/12 | |
| | | | 43/17 | |
| 2014/0033598 A1 * | 2/2014 | Camp | A01K 93/02 | |
| | | | 43/17 | |
| 2014/0250761 A1 * | 9/2014 | Preller, Jr. | A01K 97/12 | |
| | | | 43/17 | |
| 2016/0120161 A1 * | 5/2016 | Aiello | A01K 97/01 | |
| | | | 43/16 | |
| 2017/0055510 A1 * | 3/2017 | Harrell | A01K 97/125 | |

* cited by examiner

LIMB LINE FISHING DEVICE

CROSS-REFERENCE TO RELATED APPLICATIONS

This application is a continuation-in-part application of, and claims the benefit of, U.S. patent application Ser. No. 13/905,507, entitled "Limb Line Fishing Device" and filed on May 30, 2013. U.S. patent application Ser. No. 13/905,507 claims the benefit of U.S. Provisional Application No. 61/658,982, entitled "Limb Line Fishing Device" and filed on Jun. 13, 2012. The complete disclosure of both patent applications is hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates generally to a fishing device and, more particularly, to a limb line fishing device.

2. Brief Description of the Related Art

As an alternative to traditional fishing methods utilizing a fishing pole comprising a rod and a reel, fisherman also use a fishing method called limb lining. Limb lining involves tying one end of a fishing line or rope to a limb while the other end is tied to a hook. The hook is baited and lowered into the water. Typically, fishermen set multiple limb lines in a given area and return at a later time to check to see if a fish has been caught on the hook.

One disadvantage of using a prior art limb line is that, because the limb line is not easily storable, fisherman typically cut a new length of line and attach a new hook to the line each time the fisherman wants to use a limb line. In addition, it can be an onerous task to check the limb lines for fish because of their locations along the shoreline and because they must each be pulled from the water to check their hooks for fish.

It would therefore be desirable to develop a limb line fishing device capable of securing a reusable line and a hook. It would also be desirable to develop a limb line fishing device with an indicator that can be used to determine at a distance whether a fish is caught on the hook.

BRIEF SUMMARY OF THE INVENTION

The present invention is directed to a limb line fishing device comprising: (a) a length of fishing line; and (b) an indicator, wherein the indicator slidably receives the fishing line.

These and other features, objects and advantages of the present invention will become better understood from a consideration of the following detailed description of the preferred embodiments and appended claims in conjunction with the drawings as described following:

DETAILED DESCRIPTION OF THE INVENTION

With reference to FIGS. 1-9, the preferred embodiments of the present invention may be described. As shown in FIGS. 1-2 and 6-7, the limb line fishing device 10 is comprised of a line 12, a hook 14, and an indicator 16. The line 12 is preferably a length of fishing line or a rope capable of supporting the weight of a fish. The hook 14 is a fishing hook of the type well-known to those skilled in the art. The indicator 16 is preferably in the shape of a cylindrical tube or a flat plate.

Figure 1:
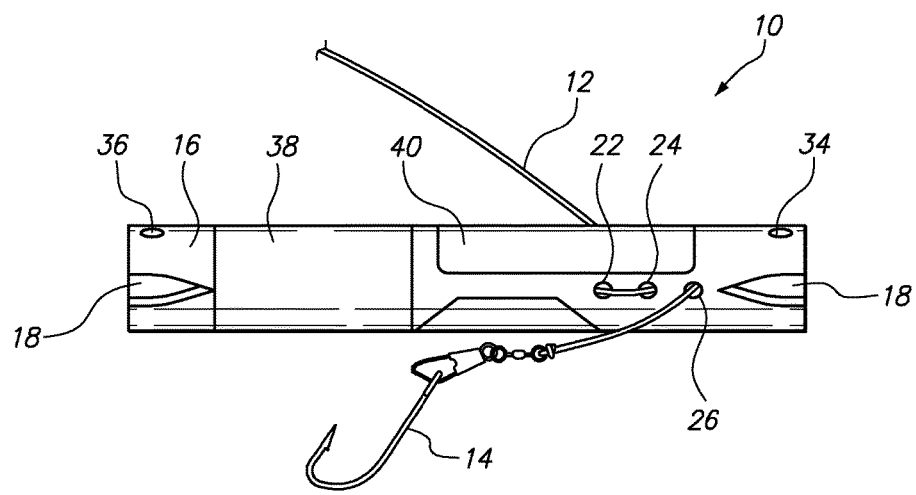
FIG. 1 is a side view of the first preferred embodiment of the limb line fishing device in the unlocked position.
Figure 2:
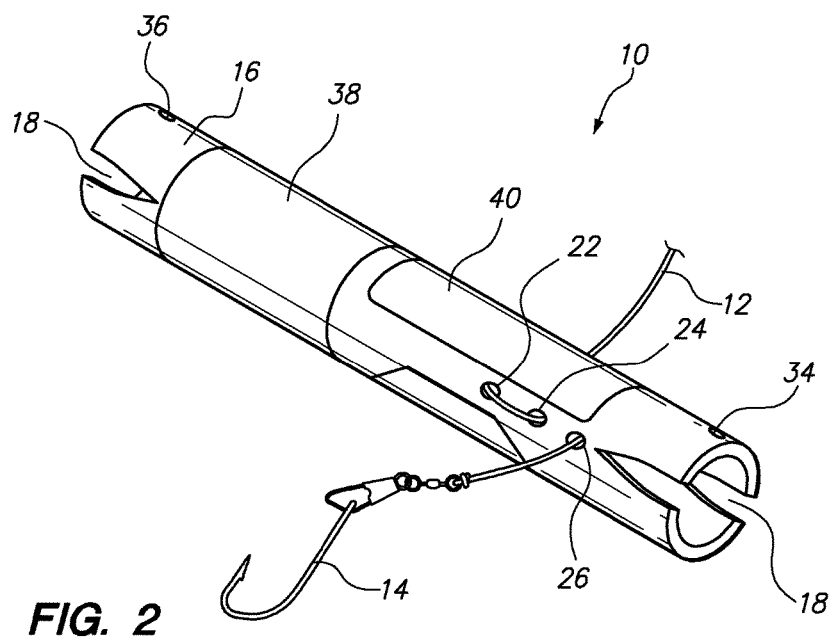
FIG. 2 is a perspective view of the first preferred embodiment of the limb line fishing device in the unlocked position.
Figure 3:
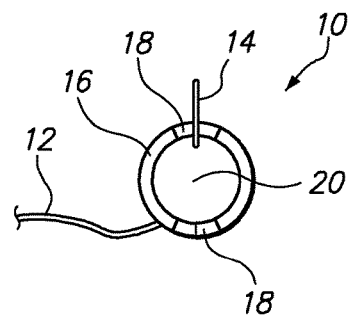
FIG. 3 is a top view of the second end of the first preferred embodiment of the limb line fishing device.
Figure 4:
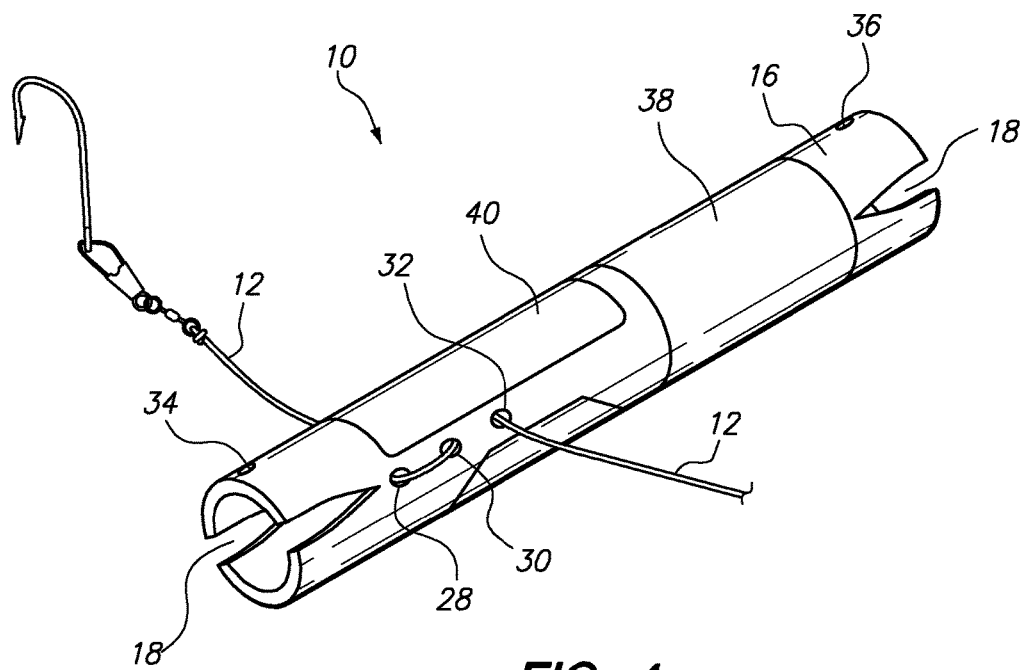
FIG. 4 is a perspective view of the first preferred embodiment of the limb line fishing device in the unlocked position.

In the first preferred embodiment, the indicator 16 is in the form of an indicator tube as shown in FIG. 1-5. The indicator tube is preferably made of PVC or another material that is similarly durable and light-weight, such as other types of plastic. The indicator tube is hollow and preferably in the shape of a cylinder. As shown in FIGS. 1-5, each end of the indicator tube preferably has two notches 18. In some embodiments, as shown in FIG. 3, a plug 20 is positioned inside and near each end of the indicator tube made of PVC or foam. The indicator tube is capable of floating in water. On opposite surfaces of the indicator tube are a series of three holes, preferably equally spaced apart, sized to slidably receive the line 12. As shown in FIGS. 1-2 and 4, the first surface of the indicator tube comprises holes 22, 24, 26, while the second surface of the indicator tube comprises holes 28, 30, 32. The indicator tube also has two single holes opposite one another at each end of the indicator tube which are sized to slidably receive the line 12. As shown in FIGS. 1-2 and 4, the first end of the indicator tube comprises holes 34, while the second end of the indicator tube comprises holes 36. The exterior surface of the indicator tube preferably has a reflective sticker 38 and a sticker 40 with identifying information about the owner of the fishing device 10, such as their name and fishing license number. The reflective sticker 38 aids the fisherman using the device 10 to located it in the dark.

Figure 6:
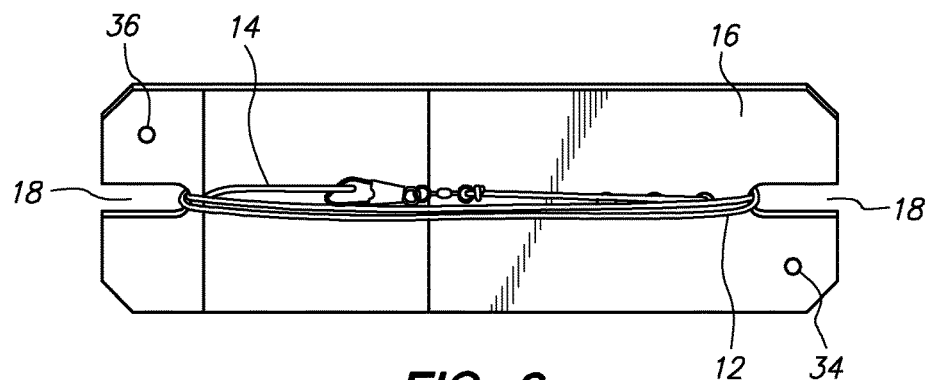
FIG. 6 is a side view of the second preferred embodiment of the limb line fishing device in the locked position.
Figure 7:
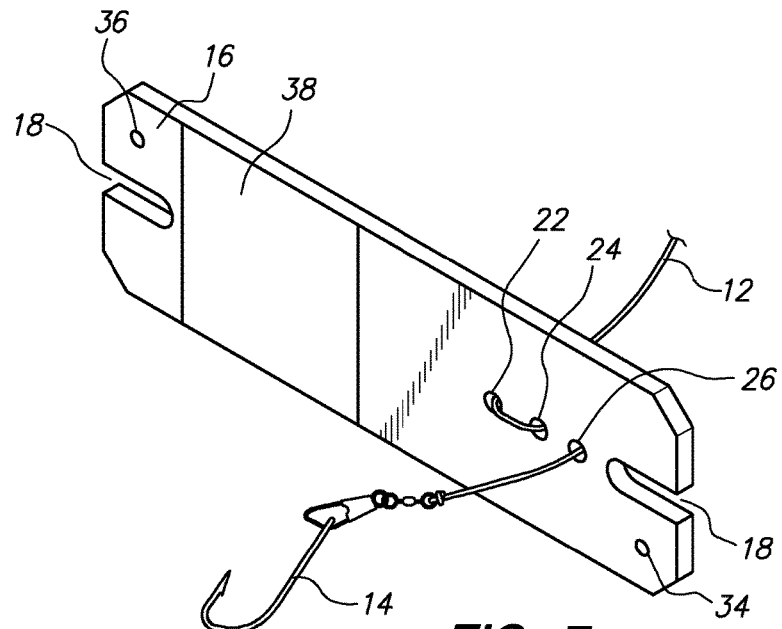
FIG. 7 is a perspective view of the second preferred embodiment of the limb line fishing device in the unlocked position.

The line 12 and the indicator tube are attached by threading the free end 42 of line 12 through holes 22, 24, 26, 28, 30, 32 of the indicator tube. The line 12 is first threaded through hole 26 into the interior of the indicator tube and out through hole 28. The line 12 is then looped and threaded through hole 30 into the interior of the indicator tube and out through hole 24. The line 12 is then looped and threaded through hole 22 into the interior of the indicator tube and out through hole 32. As shown in FIGS. 6-7, in threading the line 12 through the holes 22, 24, 26, 28, 30, 32, the free end 42 and hook end 44 of the line 12 make an S-shape. By threading more of the free end 42 of the line 12 into hole 30 and pulling more of the hook end 44 of the line out of hole 26, the indicator tube can be moved towards the free end 42 of the line 12. By doing the opposite, the indicator tube can be moved towards the hook 14 on the line 12. Adjusting the position of the indicator tube on the line 12 may be desirable depending on the depth of the water in which the device 10 is being used.

In the second preferred embodiment, the indicator 16 is in the form of an indicator plate as shown in FIG. 6-7. The indicator plate is preferably a flat, rectangular plate made of plastic, fiberglass, or other light weight and durable materials that are well-known to those skilled in the art. The indicator plate is capable of floating in water. Each end of the indicator plate preferably has a notch 18. A series of three holes 22, 24, 26 extend through the indicator plate. The holes are preferably equally spaced apart and sized to slidably receive the line 12. The indicator plate also has a single hole at each end of the indicator plate which are sized to slidably receive the line 12. As shown in FIGS. 6-7, the first end of the indicator plate comprises hole 34, while the second end of the indicator plate comprises hole 36. The exterior surface of the indicator plate preferably has a reflective sticker 38 to aid the fisherman using the device 10 to locate it in the dark.

The line 12 and the indicator plate are attached by threading the free end 42 of the line 12 through holes 22, 24, 26 of the indicator plate. The line 12 is first threaded through the front side of hole 26 and then looped through the back side of hole 24. The line 12 is then threaded through the front side of hole 22. By threading the line 12 through holes 22, 24, 26, the free end 42 and hook end 44 of the line makes an S-shape. By threading more of the free end 42 of the line 12 into the back side of hole 22 and pulling more of the hook end 44 of the line out of the front side of hole 26, the indicator plate can be moved towards the free end 42 of the line 12. By doing the opposite, the indicator plate can be moved towards the hook 14 on the line 12.

Figure 8:
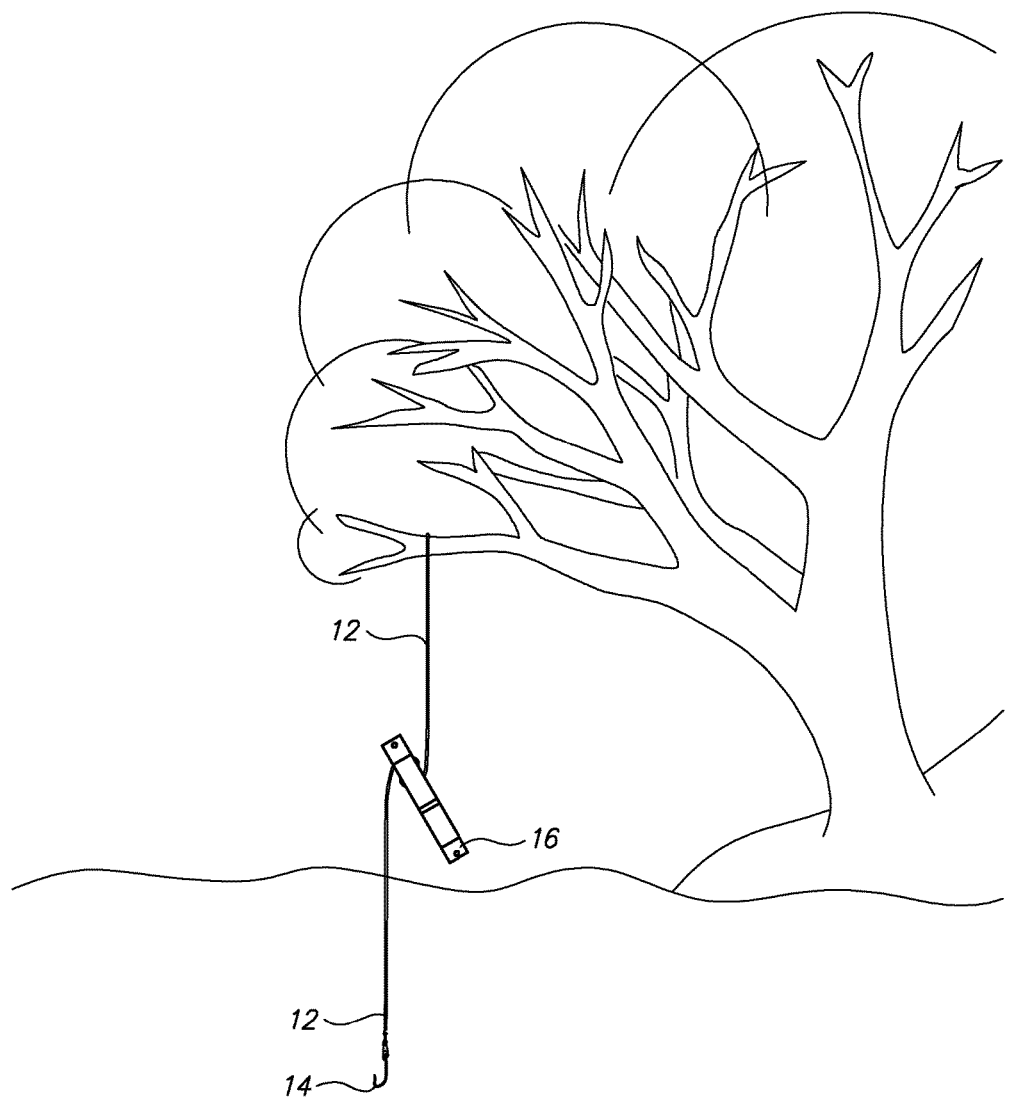
FIG. 8 is a perspective view of the limb line fishing device with the indicator in the down position.
Figure 9:
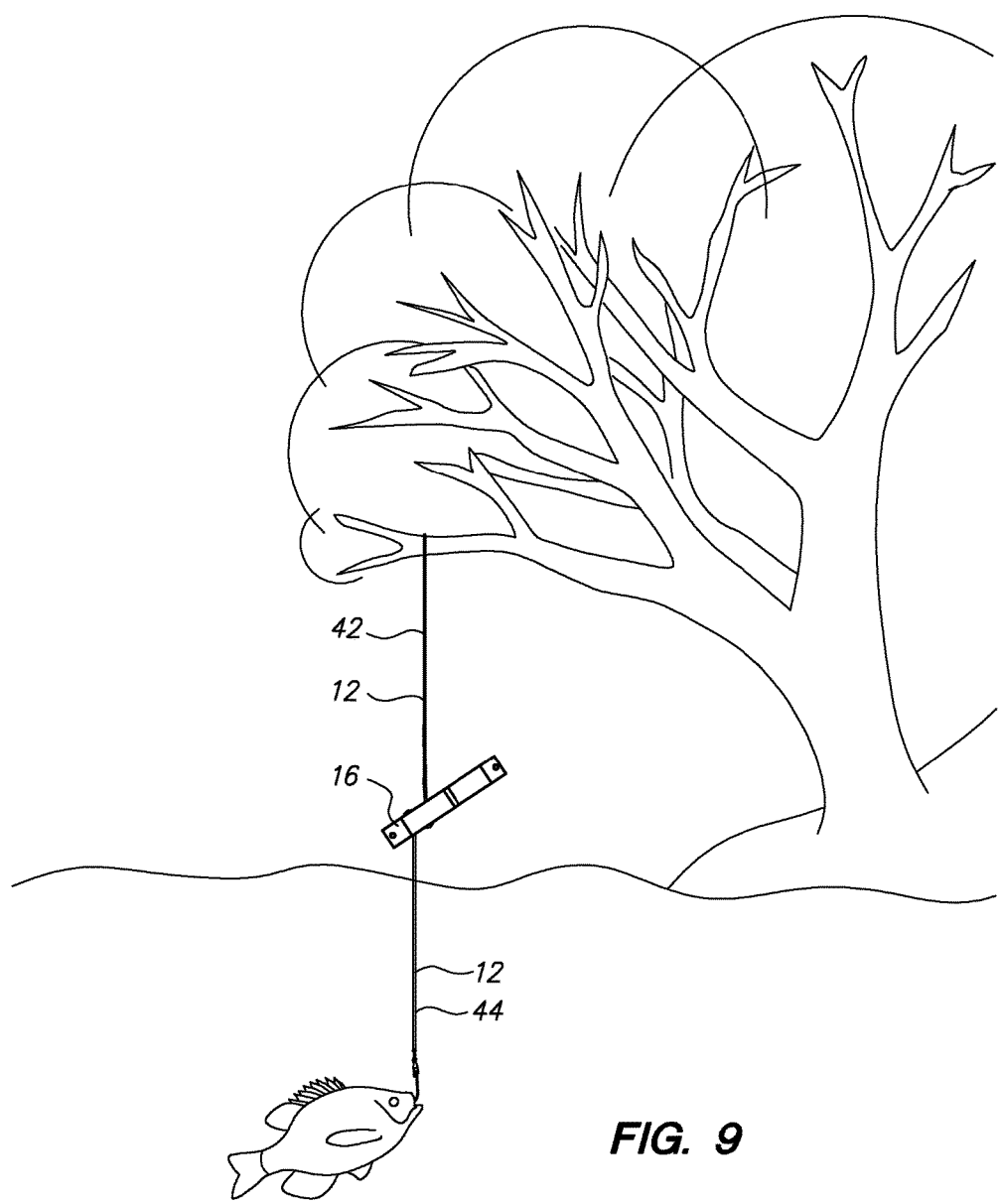
FIG. 9 is a perspective view of the limb line fishing device with the indicator in the up position.

As shown in FIGS. 8-9, to use the limb line fishing device 10, the free end 42 of the line 12 is attached to a tree, stump, or similar fixed object in the vicinity of the water. The hook is then baited and lowered into the water. Because the entire length of the indicator 16 should be positioned above the surface of the water, the indicator 16 may require adjustment on the line 12 as previously described. The indicator 16 has an up position and a down position. Before a fish is caught on the hook 14, the indicator 16 is in the down position as shown in FIG. 6. Once a fish is caught on the hook 14, and downward tension is exerted on the line 12, the indicator 16 flips upward and converts to the up position as shown in FIG. 7. Because the hook 14 is below the surface of the water, and commonly unseen without removing it from the water, the position of the indicator 16 can be used to readily determine at a distance whether a fish has been caught. This feature can save considerable time of the fisherman in checking the line.

Figure 5:
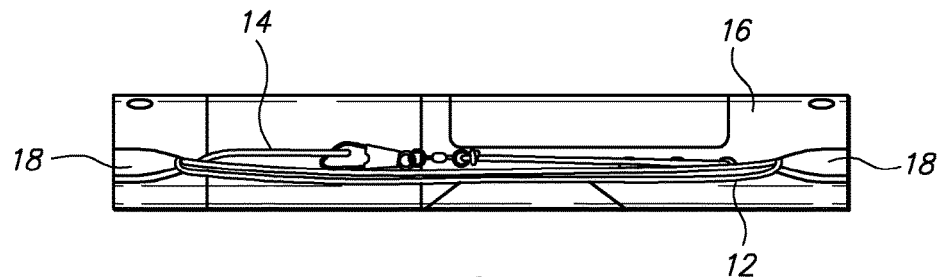
FIG. 5 is a side view of the first preferred embodiment of the limb line fishing device in the locked position.

The indicator 16 also serves to securely store the line 12 and hook 14 when the device 10 is not in use. As shown in FIGS. 5-6, the hook 14 can be received by notch 18 to prevent the hook being inadvertently damaged when the device 10 is not in use and also to prevent injury to those that may come into contact with the device 10. The line 12 can be wrapped lengthwise around the indicator tube 16 through the two notches 18. Once the line 12 has been wrapped around the tube 16 as many times as possible, the remaining line 12 can be secured by threading it through either hole 34 or hole 36. In this regard, the device 10 has a locked position as shown in FIGS. 5-6, and an unlocked position as shown in all the other figures.

The limb line fishing device 10 may be used to catch all types of fish and other water animals (e.g. alligators). Therefore, the size of the indicator 16, the size and strength of the line 12, and the number and size of the holes 22, 24, 26, 28, 30, 32, 34, 36 may vary depending on the intended use of the device 10. It should be understood that the shape of the indicator 16 is not limited to a cylindrical tube or a flat plate, but instead can be any shape suitable to carry out the functions of the indicator explained above.

Although illustrative embodiments of the invention have been described in detail, it is to be understood that the present invention is not limited to those precise embodiments, and that various changes and modifications can be effected therein by one skilled in the art without departing from the scope and spirit of the invention as defined by the claims.

The present invention has been described with reference to certain preferred and alternative embodiments that are intended to be exemplary only and not limiting to the full scope of the present invention as set forth in the appended claims.

I claim:

1. A limb line fishing device comprising:
   (a) a length of fishing line comprising a first end and a second end, wherein a fishing hook is connected to said first end of said fishing line; and
   (b) an indicator having a first end and a second end and a first longitudinal side and a second longitudinal side, wherein said indicator has a plurality of holes, each of said plurality of holes extending from said first longitudinal side of said indicator to said second longitudinal side of said indicator, wherein said indicator slidably receives said fishing line through said plurality of holes, wherein said limb line fishing device is configured such that said first end of said indicator points towards said fishing hook while suspended in air by said fishing line unless tension is applied to said first end of said fishing line.

2. The limb line fishing device of claim 1, wherein said indicator comprises a first notch and a second notch.

3. The limb line fishing device of claim 2, wherein said fishing hook engages said first notch of said indicator when said limb line fishing device is in a locked position.

4. The limb line fishing device of claim 1, wherein said fishing line is wrapped longitudinally around said indicator when said limb line fishing device is in a locked position.

5. A limb line fishing device comprising:
   (a) a length of fishing line comprising a first end and a second end, wherein a fishing hook is connected to said first end of said fishing line; and
   (b) an indicator having a first hole, a second hole and a third hole positioned along a longitudinal length of said indicator, wherein each of said first hole, said second hole and said third hole extends laterally through said indicator from a first longitudinal side of said indicator to a second longitudinal side of said indicator, wherein said indicator slidably receives said fishing line through said first hole, said second hole and said third hole, wherein said limb line fishing device is configured such that a first end of said indicator points towards said fishing hook while suspended in air by said fishing line unless tension is applied to said first end of said fishing line.

6. The limb line fishing device of claim 5, wherein said fishing line is wrapped longitudinally around said indicator when said limb line fishing device is in a locked position.

7. The limb line fishing device of claim 5, wherein said indicator comprises a first notch and a second notch and said fishing hook engage said first notch of said indicator when said limb line fishing device is in a locked position.

8. A limb line fishing device comprising:
(a) a length of fishing line comprising a first end and a second end, wherein said first end of said fishing line is connected to a fishing hook and said second end of said fishing line is operable to be connected to a fixed object; and
(b) an indicator comprising a first end and a second end, wherein said indicator comprises a first longitudinal side and a second longitudinal side, wherein said indicator comprises a first hole, a second hole and a third hole, wherein said first hole extends from said first longitudinal side of said indicator to said second longitudinal side of said indicator, wherein said second hole extends from said first longitudinal side of said indicator to said second longitudinal side of said indicator, wherein said third hole extends from said first longitudinal side of said indicator to said second longitudinal side of said indicator, wherein said first hole is offset from said second hole, wherein said first hole, said second hole and said third hole of said indicator slidably receive said fishing line, wherein said limb line fishing device is configured such that said first end of said indicator transitions from pointing downward towards said fishing hook when said indicator is suspended in air from said fixed object by said fishing line to pointing upward when tension is applied to said first end of said fishing line.

9. The limb line fishing device of claim 8, wherein said first end of said indicator comprises a first notch and said second end of said indicator comprises a second notch.

10. The limb line fishing device of claim 9, wherein said fishing hook engages said first notch of said indicator when said limb line fishing device is in a locked position.

11. The limb line fishing device of claim 8, wherein said indicator further comprises a reflector.

12. The limb line fishing device of claim 8, wherein said indicator is adjustable along said length of fishing line.

13. The limb line fishing device of claim 8, wherein said fixed object is a tree limb or a tree stump.

14. The limb line fishing device of claim 8, wherein said fishing line is wrapped longitudinally around said indicator when said limb line fishing device is in a locked position.

15. The limb line fishing device of claim 8, wherein said indicator is a hollow tube.

16. The limb line fishing device of claim 8, wherein said indicator is a flat plate.

* * * * *